United States Patent
Tong

(10) Patent No.: US 8,817,844 B2
(45) Date of Patent: Aug. 26, 2014

(54) PARALLEL NARROW BAND TRANSMISSION

(75) Inventor: Fei Tong, Royston (GB)

(73) Assignee: Cambridge Silicon Radio Limited, Cambridge (GB)

( * ) Notice: Subject to any disclaimer, the term of this patent is extended or adjusted under 35 U.S.C. 154(b) by 221 days.

(21) Appl. No.: 13/416,335

(22) Filed: Mar. 9, 2012

(65) Prior Publication Data
US 2013/0235943 A1 Sep. 12, 2013

(51) Int. Cl.
*H04B 1/00* (2006.01)

(52) U.S. Cl.
USPC ........... 375/141; 375/267; 375/299; 370/322; 370/329; 455/450; 455/509

(58) Field of Classification Search
USPC ......... 375/140, 141, 146, 260, 267, 295, 299; 370/322, 329, 330, 341, 431, 436, 468; 455/450, 452.1, 464, 509, 702, 703
See application file for complete search history.

(56) References Cited

U.S. PATENT DOCUMENTS

| | | | | |
|---|---|---|---|---|
| 7,355,960 | B2 * | 4/2008 | Kang et al. | 370/208 |
| 7,529,548 | B2 * | 5/2009 | Sebastian | 455/452.1 |
| 7,936,806 | B2 * | 5/2011 | Yu et al. | 375/135 |
| 8,483,257 | B2 * | 7/2013 | Ahn et al. | 375/135 |
| 2008/0159246 | A1 | 7/2008 | Niemela | |
| 2008/0310359 | A1 * | 12/2008 | McBeath et al. | 370/329 |
| 2010/0111030 | A1 | 5/2010 | Almgren et al. | |
| 2010/0248766 | A1 | 9/2010 | Chun et al. | |

FOREIGN PATENT DOCUMENTS

EP 2273716 1/2011

OTHER PUBLICATIONS

GB Search Report for GB Appln. No. 1302037.5, dated Aug. 6, 2013.

\* cited by examiner

*Primary Examiner* — Dac Ha
(74) *Attorney, Agent, or Firm* — RatnerPrestia

(57) ABSTRACT

A method of transmitting a plurality of signals from a transmitting station to a plurality of receiving stations in a transmission channel having a plurality of sub-channels, the method comprising:
transmitting a first signal in a first sub-channel to a first receiving station;
transmitting a second signal in a second sub-channel to a second receiving station; whereby the first and second signals are transmitted simultaneously.

16 Claims, 2 Drawing Sheets

PARALLEL NARROW BAND TRANSMISSION

BACKGROUND TO THE INVENTION

It is common practice for various devices to communicate with one another using wireless data transmission. Examples of such devices include consumer electronics products, such as mobile telephones and mobile computing devices and distributed date centre networks operating to collect data in a commercial or industrial setting and report that data back to a central location. An example of such a wireless transmission system is that based on the IEEE 802.11 transmission standards, generically referred to by most consumers simply as "WiFi". The increasing use of wireless transmission systems such as the 802.11 standards is intended to support new outdoor uses, such as smart grids, industrial process sensor networks and extended range WiFi for cellular traffic offloading, as well as the traditional indoor wireless access functions experienced by most consumers.

The traffic pattern from these applications varies significantly. For the smart grid and industrial process centres networks, the required data rates can be as low as 100 kbps and the data traffic is periodical and of small payload size, for instance 250 bits per packet. On the other hand, for extended range WiFi intended for cellular traffic offloading, the traffic may require a data rate of up to 10 Mbps with a large packet size and a very "burst" transmission pattern. For cost-efficient usage within any single wireless network, the network stations must be capable of providing these different services.

The wireless transmissions standards adopted for such systems typically require that transmission over a number of different bandwidths is supported. For example, it may be mandated that the devices conforming to the standards support reception of signals transmitted in both 1 MHz and 2 MHz bandwidths. Support for other bandwidth options may be optional. In general, the devices that have low traffic requirements, in particular small data packet sizes, by preference use narrow signal bandwidth, while high traffic stations use wide bandwidths. When the transmission channel bandwidth of the system is larger than one 1 MHz, the stations within the network may operate in different bandwidths.

One mechanism for supporting both narrow band and wide band transmission within the same transmission channel requires that the narrow bandwidth signal occupies the primary channel within the wider channel bandwidth. For mixed bandwidth operation, this results in an inefficient use of the overall spectrum and only a part of the available spectrum is utilised during narrow band transmission.

SUMMARY OF THE INVENTION

According to a first aspect of the present invention there is provided a method of transmitting a plurality of signals from a transmitting station to a plurality of receiving stations in a transmission channel having a plurality of sub-channels, the method comprising: transmitting a first signal in a first sub-channel to a first receiving station; transmitting a second signal in a second sub-channel to a second receiving station; whereby the first and second signals are transmitted simultaneously.

Prior to transmission, each of the plurality of signals may be digitally encoded and mapped to a portion of the frequency domain, each signal being mapped to different portions of the frequency domain.

Each receiving station may be configured to receive signals transmitted in a predetermined sub-channel.

The method may further include alternatively transmitting a single signal across the full bandwidth of the transmission channel, whereby each receiving station receives said signal.

Each transmitted signal may include a portion containing a data symbol having a value that indicates whether the transmitted signal is transmitted across the full bandwidth of the transmission signal or in a one of said sub-channels.

Each receiving station may be arranged to analyse an initial portion of a received signal to determine if the received signal is transmitted in one of said sub-channels or across the full width of the transmission channel.

Each receiving station may transmit an acknowledge signal in response to receiving a respective signal on a sub-channel, each receiving station being configured to transmit said acknowledge signal on the same sub-channel at a different time period after receiving the respective signal.

Each receiving station may transmit an acknowledge signal in response to receiving a respective signal on a sub-channel, each receiving station transmitting said respective acknowledge signal either the same time period after receiving the respective signal or a different time period and transmitting said acknowledge signal in the same sub-channel the respective received signal was transmitted in.

According to a second aspect of the present invention there is provided a transmitter configured to transmit a plurality of signals to a plurality of receivers in a transmission channel having a plurality of sub-channels, wherein the transmitter is configured to transmit a first signal in a first sub-channel to a first receiver and transmit a second signal in a second sub-channel to a second receiver, the first and second signals being transmitted simultaneously.

The transmitter may be further configured to digitally encoded and map each of the plurality of signals to a portion of the frequency domain prior to transmission, each signal being mapped to a different portion of the frequency domain.

The transmitter may be further configured to alternatively transmit a single signal across the full bandwidth of the transmission channel.

Each transmitted signal may include a portion containing a data symbol having a value that indicates whether the transmitted signal is transmitted across the full bandwidth of the transmission signal or in a one of said sub-channels.

According a third aspect of the present invention there is provided a communications system comprising: a transmitter arranged to transmit a plurality of signals in a transmission channel having a plurality of sub-channels; a first receiver arranged to receive a first signal transmitted by the transmitter in a first sub-channel; and a second receiver arranged to receive a second signal transmitted by the transmitter in a second sub-channel, wherein the first and second signals are transmitted simultaneously.

Prior to transmission, each of the first and second signals may be digitally encoded and mapped to a portion of the frequency domain, each signal being mapped to different portions of the frequency domain.

Each receiving station may be configured to receive signals transmitted in a predetermined sub-channel.

The transmitter may be further configured to transmit a single signal across the full bandwidth of the transmission channel, whereby each receiver receives said signal.

Each transmitted signal may include a portion containing a data symbol having a value that indicates whether the transmitted signal is transmitted across the full bandwidth of the transmission signal or in a one of said sub-channels.

Each receiver may be arranged to analyse an initial portion of a received signal to determine if the received signal is transmitted in one of said sub-channels or across the full width of the transmission channel.

Each receiver may be arranged to transmits an acknowledge signal in response to receiving a respective signal on a sub-channel, each receiver being configured to transmit said acknowledge signal in the same sub-channel at a different time period after receiving the respective signal.

Each receiver may be arranged to transmit an acknowledge signal in response to receiving a respective signal on a sub-channel, each receiver being arranged to transmit said respective acknowledge signal either the same time period after receiving the respective signal or at different times and to transmit said acknowledge signal in the same sub-channel the respective received signal was received in.

BRIEF DESCRIPTION OF THE DRAWINGS

Some embodiments of the present invention will now be described below, by way of non-limiting illustrative example only, with reference to the accompanying figures, of which.

DETAILED DESCRIPTION OF EMBODIMENTS OF THE INVENTION

Figure 1A:
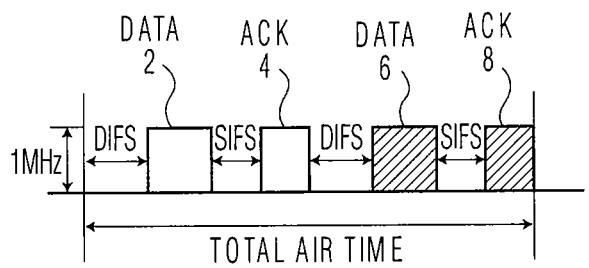
FIGS. 1a & 1b schematically illustrate a sequential downlink transmission to two stations.
Figure 1B:
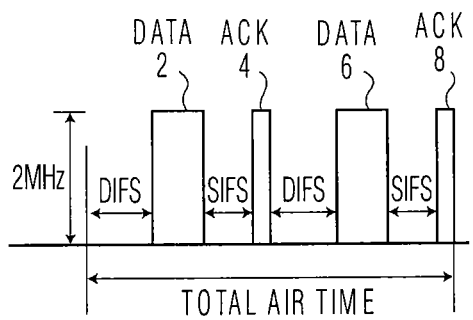

FIGS. 1a & 1b schematically illustrate the transmission of two data frames at two separate receiving stations within a wireless system where the access point, i.e. the transmitting station, e.g. a WiFi hub, has a 2 MHz transmission channel. Both receiving stations are capable of receiving both 1 MHz and 2 MHz signals. FIG. 1a depicts the sequential transmission of the two data frames 2, 6 together with the ACK (acknowledge) response frames 4, 8 transmitted by the receiving stations, using a 1 MHz signal, whilst FIG. 1b depicts the sequential transmission of the two data frames using a 2 MHz signal. As illustrated, the total transmission time for the 2 MHz signals is less than that for the sequentially transmitted 1 MHz signals. However, as noted previously, some receiving stations within such wireless systems whilst having the capability of transmitting over both the 1 MHz and 2 MHz bandwidths, tend by default to operate primarily using the 1 MHz channel.

Figure 2A:
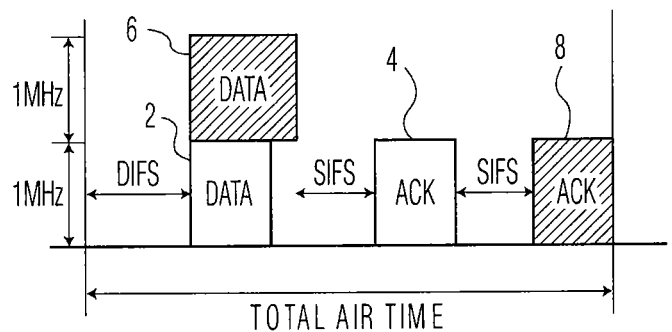
FIGS. 2a & 2b schematically illustrate a parallel downlink transmission to two stations in accordance with an embodiment of the present invention.
Figure 2B:
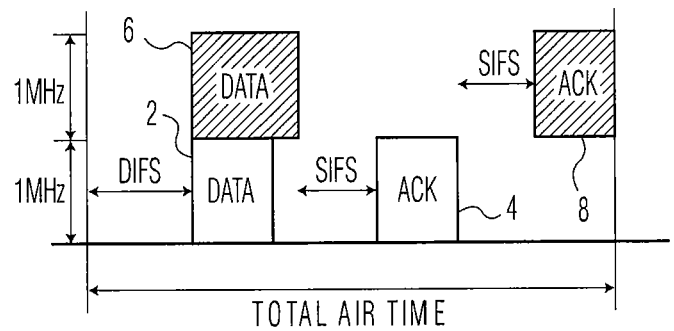

In accordance with embodiments of the present invention, and as illustrated in FIGS. 2a & 2b, two data frames are transmitted simultaneously in time, i.e. in parallel, but in different 1 MHz sub-channels within the overall 2 MHz transmission channel. The two receiving stations are signalled in advance which of the 1 MHz sub-channel they should listen to and therefore each receiving station receives their respective data frames on their own allocated 1 MHz channel. After receiving the data frames, each of the two receiving stations needs to transmit back an ACK frame. In some embodiments, as illustrated in FIG. 2a, each receiving station is configured to transmit its ACK frame using a different time delay with respect to the end of the received frame, thus ensuring that the two ACK frames from the two receiving stations do not collide with each other, i.e. are not transmitted at the same time on the same sub-channel. As the data frames in the two sub-channels may have different frame lengths, as illustrated in FIG. 2a, the reference time for the transmission of ACK frame should be the end of longest frame in whichever 1 MHz sub-channel. In other embodiments, as illustrated in FIG. 2b, the ACK frame is transmitted on the same sub-channel as the receiving station receives its data frame.

Figure 3:
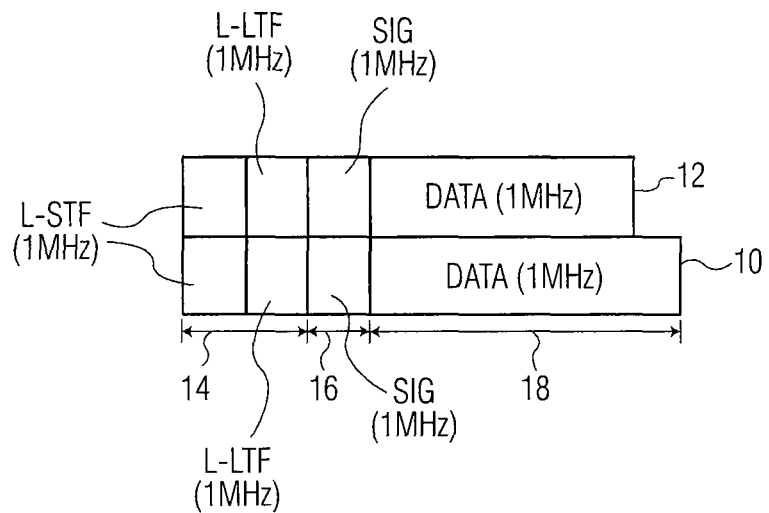
FIG. 3 schematically illustrates the frame structure of a downlink transmission in accordance with an embodiment of the present invention.

FIG. 3 depicts a typical frame structure for a first and second signal of a parallel downlink transmission according to embodiments of the present invention. The first and second signals 10, 12 have a number of portions. The first portion 14 of the signals is generally referred to as the preamble and in embodiments of the present invention the preamble for a parallel transmission is a narrow band signal repeated in all of the sub-channels, i.e. across both channels for the example depicted in FIG. 3. This is in contrast to a single wide band transmission in which a single preamble is transmitted across the full channel bandwidth. In the particular example depicted in FIG. 3, the preamble for each of the first and second signals includes L-STF and L-LTF fields, which are short training fields and long training fields used in orthogonal frequency division multiplexing (OFDM) to enable the respective receiving stations to acquire the incoming signal. A second portion 16 may be a signal field including data identifying the modulation and encoding scheme applied to the subsequent data portions, plus the information necessary for the successful decoding of the data portions by the receiving stations. In some embodiments the modulation and encoding scheme applied to the data in each sub-channel will be the same, to reduce the encoding hardware and software requirements, and therefore the signal field 16 can be a common wide band signal transmitted across the entire bandwidth of the transmission channel. However, in other embodiments different modulation and encoding schemes may be applied to each of the signals in the respective sub-channels and therefore individual signal fields transmitted across individual sub-channels will be required. The third portion depicted in FIG. 3 represents the actual transmitted data in each of the first and second signals, the length of which may vary between the different sub-channels (as indicated in FIG. 3). It will of course be appreciated that the exact composition of the narrow band signals transmitted on each sub-channel may vary from that depicted in FIG. 3 depending upon the characteristics of the transmission channel and the selected transmission protocols.

Figure 4:
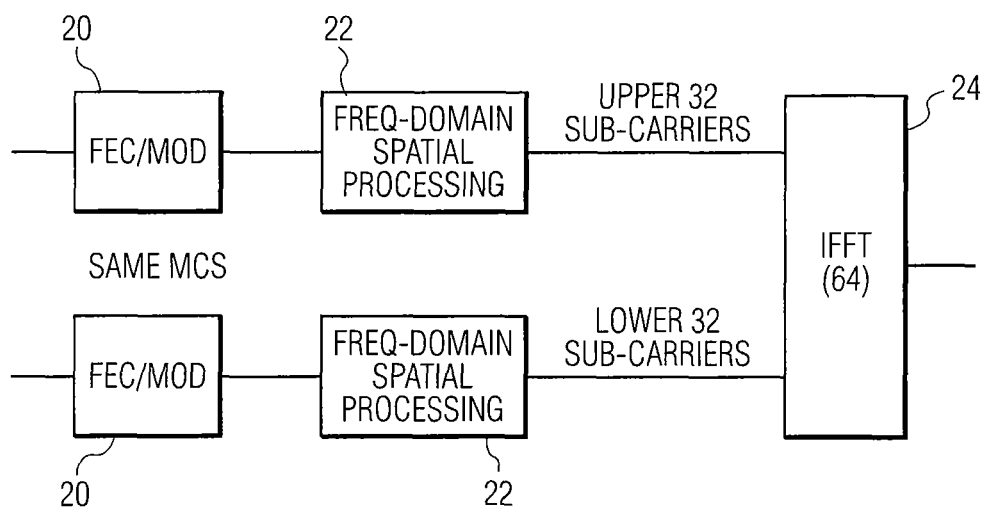
FIG. 4 shows a block diagram of the transmission processing for a parallel downlink transmission according to embodiments of the present invention.

To implement parallel transmission in embodiments of the present invention, the data from the separate multiple payloads is encoded independently and the encoded and modulated signals are mapped to separate portions of the sub-carriers before being transferred into a time-domain signal. This process is schematically illustrated in FIG. 4, in which the data for each of the first and second signals 10, 12 is separately encoded and modulated by using known encoding and modulation techniques. As mentioned above, to reduce software and hardware overheads, the modulation encoding schemes for each of the parallel signals is preferably the same. From each of the encoder/modulators 20 the respective signals are passed to frequency domain spatial processing elements 22, which may be implemented using conventional digital signal processing techniques, and which map the separate signals to different portions of the sub-channels in terms of the frequency domain. The separate encoded data signals are then input to an Inverse Fast Fourier Transform (IFFT) processor 24 to generate the resulting time-domain output signal.

As transmission systems in accordance with embodiments of the present invention may transmit either single narrow band signals, single wide band signals or parallel narrow band signals, it is a requirement for the receiving stations to be able to identify instances of parallel narrow band transmissions. The identification of a parallel transmission can be achieved by in-band signalling, in which a particular bit can be carried in the signalling field, i.e. the second portion 16 depicted in FIG. 3, to indicate whether the current transmission contains parallel, i.e. in sub-channels, transmissions. Alternatively, the receiving stations may be configured to analyse the preamble waveform of a received signal to determine whether or not that signal is a parallel narrow band transmission. This analysis is achieved by exploiting the wave form difference that will occur between the wide-band preamble wave form and the parallel narrow-band preamble wave forms.

Each receiving station within a transmission system according to embodiments of the present invention is allocated a sub-channel for the purposes of parallel narrow-band transmissions. For example, the allocation of the receiving stations may be predetermined and each receiving station notified of its allocation during the association stage, i.e. when the receiving station joins, or becomes "associated" with the transmitting station. Once a receiving station has been notified of its allocation, it will monitor its allocated sub-channel to detect transmissions on that sub-channel when parallel transmissions are indicated. The receiving station allocation may be updated periodically according to variations in the traffic loading in the transmission network.

With reference again to FIGS. 2a & 2b, the ACK frame for the first signal 4 is transmitted by the respective receiving station a specified time period after the first signal 2 has been received. To avoid collision of ACK frames, the ACK frame 8 for the second signal is transmitted a greater period after the second signal 6 is received by its respective receiving station. In embodiments of the present invention, the gap between the reception of a data frame and the transmission of the corresponding ACK frame is fixed depending on the allocation of sub-channel to each receiving station. In alternative embodiments, ACK frames can be transmitted in parallel (i.e. simultaneously) occupying the sub-channel from which the receiving station is receiving the downlink transmission. This further improves the spectrum utilisation as it reduces the overhead on the uplink transmission duration in a similar manner to the downlink transmission. For such embodiments, power control is required so that the received power on each sub-channel from different receiving stations is similar in level and the signal in one sub-channel will not desensitise the reception of the signal in the other sub-channel.

In further embodiments of the present invention subsequent to an initial parallel narrow-band transmission, further two-way transmission between the transmitting station and one or more of the receiving stations may be accomplished using the RTS/CTS protocol (Request To Send/Clear To Send). However, during parallel narrow-band transmissions, each receiving station is configured to only detect signals transmitted on its allocated sub-channel and consequently each receiving station is not aware of transmissions to and from other receiving stations in the network. Consequently, in embodiments of the present invention the CTS may be transmitted by the transmitting station using the full wide-band channel bandwidth using a duplicated frame in which the same signalling field is repeated over all sub-channels. The receiving stations detecting signals on each respective sub-channel are therefore still able to receive the CTS transmission and perform carrier sensing. Moreover, in the CTS, the reserved period will take into consideration the number of ACK frames to be transmitted, thus avoiding collision between transmitting stations attempting transmission of ACK frames.

In embodiments of the present invention the use of parallel downlink transmission allows full utilisation of the available bandwidth and reduces transmission overhead. The allocation of stations into sub-channels may be semi-static and may only require insignificant signalling overhead. By defining implicit association of the sub-channel and ACK transmission gaps, collision free transmission of the ACK frames is achieved.

In the embodiments described above the total bandwidth of the transmission channel is 2 MHz and two 1 MHz sub-channels have been envisaged. However, the skilled person will appreciate that the principles of the invention can be applied to other bandwidth configurations, such as for example 2 MHz signals in 4 MHz channel or 2 MHz signals in 8 MHz channel.

The invention claimed is:

1. A method of transmitting a plurality of signals from a transmitting station to a plurality of receiving stations in a transmission channel having a plurality of sub-channels, the method comprising:
   transmitting a first signal in a first sub-channel to a first receiving station;
   transmitting a second signal in a second sub-channel to a second receiving station;
   whereby the first and second signals are transmitted simultaneously;
   wherein each receiving station transmits an acknowledge signal in response to receiving a respective signal on a sub-channel, each receiving station transmitting said respective acknowledge signal the same time period after receiving the respective signal and transmitting said acknowledge signal in the same sub-channel the respective received signal was transmitted in.

2. The method of claim 1, wherein prior to transmission, each of the plurality of signals is digitally encoded and mapped to a portion of the frequency domain, each signal being mapped to different portions of the frequency domain.

3. The method of claim 1, wherein each receiving station is configured to receive signals transmitted in a predetermined sub-channel.

4. The method of claim 1, wherein the method comprises alternatively transmitting a single signal across the full bandwidth of the transmission channel, whereby each receiving station receives said signal.

5. The method of claim 4, each transmitted signal includes a portion containing a data symbol having a value that indicates whether the transmitted signal is transmitted across the full bandwidth of the transmission signal or in a one of said sub-channels.

6. The method of claim 4, wherein each receiving station is arranged to analyse an initial portion of a received signal to determine if the received signal is transmitted in one of said sub-channels or across the full width of the transmission channel.

7. A transmitter configured to transmit a plurality of signals to a plurality of receivers in a transmission channel having a plurality of sub-channels, wherein:
   the transmitter is configured to transmit a first signal in a first sub-channel to a first receiver and transmit a second signal in a second sub-channel to a second receiver, the first and second signals being transmitted simultaneously; and
   the transmitter is configured to receive respective acknowledge signals each acknowledge signal being received the same time period after transmitting the respective signal and being received in the same sub-channel the respective transmitted signal was transmitted in.

8. The transmitter of claim 7 further configured to digitally encode and map each of the plurality of signals to a portion of the frequency domain prior to transmission, each signal being mapped to a different portion of the frequency domain.

9. The transmitter of claim 7 further configured to alternatively transmit a single signal across the full bandwidth of the transmission channel.

10. The transmitter of claim 7, wherein each transmitted signal includes a portion containing a data symbol having a value that indicates whether the transmitted signal is transmitted across the full bandwidth of the transmission signal or in a one of said sub-channels.

11. A communications system comprising:
a transmitter arranged to transmit a plurality of signals in a transmission channel having a plurality of sub-channels;
a first receiver arranged to receive a first signal transmitted by the transmitter in a first sub-channel; and
a second receiver arranged to receive a second signal transmitted by the transmitter in a second sub-channel, wherein the first and second signals are transmitted simultaneously;
wherein each receiver is arranged to transmit an acknowledge signal in response to receiving a respective signal on a sub-channel, each receiver being arranged to transmit said respective acknowledge signal the same time period after receiving the respective signal and to transmit said acknowledge signal in the same sub-channel the respective received signal was received in.

12. The communication system of claim 11, wherein prior to transmission, each of the first and second signals is digitally encoded and mapped to a portion of the frequency domain, each signal being mapped to different portions of the frequency domain.

13. The communication system of claim 11, wherein each receiving station is configured to receive signals transmitted in a predetermined sub-channel.

14. The communication system of claim 11, wherein the transmitter is further configured to transmit a single signal across the full bandwidth of the transmission channel, whereby each receiver receives said signal.

15. The communication system of claim 14, wherein each transmitted signal includes a portion containing a data symbol having a value that indicates whether the transmitted signal is transmitted across the full bandwidth of the transmission signal or in a one of said sub-channels.

16. The communication system of claim 14, wherein each receiver is arranged to analyse an initial portion of a received signal to determine if the received signal is transmitted in one of said sub-channels or across the full width of the transmission channel.

* * * * *